US010296348B2

(12) United States Patent
Alexander et al.

(10) Patent No.: US 10,296,348 B2
(45) Date of Patent: May 21, 2019

(54) DELAYED ALLOCATION OF AN OUT-OF-ORDER QUEUE ENTRY AND BASED ON DETERMINING THAT THE ENTRY IS UNAVAILABLE, ENABLE DEADLOCK AVOIDANCE INVOLVING RESERVING ONE OR MORE ENTRIES IN THE QUEUE, AND DISABLING DEADLOCK AVOIDANCE BASED ON EXPIRATION OF A PREDETERMINED AMOUNT OF TIME

(71) Applicant: INTERNATIONAL BUSINESS MACHINES CORPORATION, Armonk, NY (US)

(72) Inventors: Khary J. Alexander, Poughkeepsie, NY (US); Ilya Granovsky, Kiryat Tivon (IL); Jonathan T. Hsieh, Poughkeepsie, NY (US); Christian Jacobi, Poughkeepsie, NY (US)

(73) Assignee: INTERNATIONAL BUSINESS MACHINES CORPROATION, Armonk, NY (US)

( * ) Notice: Subject to any disclaimer, the term of this patent is extended or adjusted under 35 U.S.C. 154(b) by 253 days.

(21) Appl. No.: 14/623,049

(22) Filed: Feb. 16, 2015

(65) Prior Publication Data

US 2016/0239311 A1 Aug. 18, 2016

(51) Int. Cl.
*G06F 9/38* (2018.01)

(52) U.S. Cl.
CPC .................................. *G06F 9/3836* (2013.01)

(58) Field of Classification Search
CPC .... G06F 9/3838; G06F 9/3826; G06F 9/3834; G06F 9/3867; G06F 9/30043; G06F 9/524; G06F 9/3855; G06F 9/3814

(Continued)

(56) References Cited

U.S. PATENT DOCUMENTS 6,230,206 B1 * 5/2001 Doole ..................... G06F 9/524 707/E17.007
6,427,193 B1 * 7/2002 Hughes ............... G06F 12/0831 711/146

(Continued)

FOREIGN PATENT DOCUMENTS

WO WO2013188460 A2 12/2013

OTHER PUBLICATIONS

Monreal, Teresa et al. Delaying Physical Register Allocation Through Virtual-Physical Registers. Proceedings of the 32nd Annual International Symposium on Microarchitecture, 1999 [online], [retrieved Dec. 21, 2016]. Retrieved from the Internet <URL: http://ieeexplore.ieee.org/stamp/stamp.jsp?arnumber=809456> <DOI: 10.1109/MICRO.1999.809456>.*

(Continued)

*Primary Examiner* — Aimee Li
*Assistant Examiner* — Shawn Doman
(74) *Attorney, Agent, or Firm* — William Kinnaman, Jr., Esq.; Blanche E. Schiller, Esq.; Heslin Rothenberg Farley & Mesiti P.C.

(57) ABSTRACT

A queue management capability enables allocation and management of tracking queue entries, such as load and/or store queue entries, at execution time. By introducing execution-time allocation of load/store queue entries, the allocation point of those entries is delayed further into the execution stage of the instruction pipeline, reducing the overall time the entry remains allocated to a specific instruction. The queue management capability may also resolve deadlock conditions resulting from execution-time allocation of the queue entries and/or provide a mechanism to avoid such deadlock conditions.

20 Claims, 11 Drawing Sheets

(58) Field of Classification Search
USPC .......................................................... 712/216
See application file for complete search history.

(56) References Cited

U.S. PATENT DOCUMENTS

| | | | | |
|---|---|---|---|---|
| 6,665,818 | B1 * | 12/2003 | Dickey ............... | G06F 11/0772 714/32 |
| 6,728,866 | B1 | 4/2004 | Kahle et al. | |
| 7,743,382 | B2 | 6/2010 | Schumacher et al. | |
| 7,953,932 | B2 * | 5/2011 | Shum .................... | G06F 9/3824 711/122 |
| 7,991,979 | B2 | 8/2011 | Abernathy et al. | |
| 8,041,928 | B2 | 10/2011 | Burky et al. | |
| 8,756,374 | B2 | 6/2014 | Cypher et al. | |
| 2003/0182537 | A1 | 9/2003 | Le et al. | |
| 2012/0324208 | A1 | 12/2012 | Alapati et al. | |
| 2013/0111191 | A1 | 5/2013 | Murray et al. | |
| 2013/0179643 | A1 | 7/2013 | Gueron et al. | |
| 2015/0121046 | A1 * | 4/2015 | Kunjan ............... | G06F 9/30043 712/225 |

OTHER PUBLICATIONS

Anonymously; "A Method and System for Precise Prediction of OSC Hazards using Distance Comparison between Store and Load Instructions"; An IP.com Prior Art Database Technical Disclosure; http://ip.com/IPCOM/000234987; pp. 1-3, Feb. 21, 2014.

Chan, CW. et al. "An algorithm for detecting and resolving store-and-forward deadlocks in packet-switched networks"; IEEE Transactions on Communications; vol. COM-35, No. 8, pp. 801-807; Aug. 1987.

Gunadi, E. et al.; "A Position-Insensitive Finished Store Buffer"; Electrical and Computer Engineering Department, University of Wisconsin; ICCD, pp. 105-112; Oct. 2007.

Monreal, T. et al.; "Dynamic Register Renaming Through Virtual-Physical Registers"; Department of Information, Zaragoza, Spain; www.jilp.org/vol2/v2paperl0.pdf.; pp. 1-20, 2000 (no further date information available).

Ponomarev, D. et al., "Reducing Power Requirements of Instruction Scheduling Through Dynamic Allocation of Multiple Datapath Resources," Proceedings 34th ACM/IEEE International Symposium on Microarchitecture, pp. 90-101, IEEE Computer Society, Dec. 2001.

Sethumadhavan, S. et al., "Late-binding: Enabling Unordered Load-Store Queries," Computer Architecture News, vol. 35, No. 2, pp. 347-357, May 2007.

Subramaniam, S. et al., "Fire-and-Forget: Load/Store Scheduling with No Store Queue at All," 2006 396h IEEE/ACM International Symposium on Microarchitecture, 12 pages; Dec. 2006.

IBM, "z/Architecture—Principles of Operation," Publication No. SA22-7832-09, 10$^{th}$ Edition, Sep. 2012, pp. 1-1568.

* cited by examiner

DELAYED ALLOCATION OF AN OUT-OF-ORDER QUEUE ENTRY AND BASED ON DETERMINING THAT THE ENTRY IS UNAVAILABLE, ENABLE DEADLOCK AVOIDANCE INVOLVING RESERVING ONE OR MORE ENTRIES IN THE QUEUE, AND DISABLING DEADLOCK AVOIDANCE BASED ON EXPIRATION OF A PREDETERMINED AMOUNT OF TIME

BACKGROUND

One or more aspects relate, in general, to out-of-order processing within computing environments, and in particular to managing resources used in such processing.

Many computing environments utilize out-of-order execution. Out-of-order execution of instructions in a processor allows significant performance improvements by balancing utilization of the execution pipes, but often, results in data hazards that are to be addressed. Typically, a set of structures, called load and store queues, is utilized to track storage operations executed out-of-order and detects cases where out-of-order memory accesses may have resulted in a wrong result, enforcing correct execution. Load/store queue tracking resources are typically limited, allowing for only a certain number of in-flight storage access instructions.

SUMMARY

Shortcomings of the prior art are overcome and additional advantages are provided through the provision of a computer system for managing allocation of resources within a computing environment. The computer system includes a memory and a processor in communications with the memory, wherein the computer system is configured to perform a method. The method includes, for instance, determining, by a processor at execution stage of an instruction pipeline of an out-of-order execution computing environment, whether an entry of a queue is available to be allocated to an instruction at the execution stage of the instruction pipeline, wherein the queue is a load queue based on the instruction being a load instruction or a store queue based on the instruction being a store instruction; detecting, based on determining that the entry is unavailable, a potential deadlock condition in which the instruction is not executed; and providing, based on detecting the potential deadlock condition, deadlock avoidance to avoid a further potential deadlock condition, wherein the providing deadlock avoidance includes reserving one or more entries of the queue for allocation to one or more selected instructions.

Methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a queue management capability is provided that enables allocation and management of tracking queue entries, such as load and/or store queue entries, at execution time. By introducing execution time allocation of load/store queue entries, the allocation point of those entries is delayed further into the execution stage of the instruction pipeline, reducing the overall time the entry remains allocated to a specific instruction. This allows better utilization of the queue; e.g., less queue entries are needed to support a certain amount of in-flight instructions, or, alternatively, a queue of the same size allows more in-flight out-of-order instructions.

Further, in accordance with one or more aspects, deadlock conditions are resolved, and optionally, avoided. It is possible that with delaying allocation of queue entries until execution stage, queue entries may be allocated to younger instructions, and as a result, older instructions are not able to allocate queue entries or execute; thus, resulting in a deadlock condition. In accordance with one or more aspects, such deadlock conditions are detected and resolved. In a further embodiment, potential deadlock conditions are identified and preventive actions are taken to avoid them.

In one embodiment of resolving a deadlock condition, if a queue is full and an instruction cannot allocate an entry in the queue to be used for execution of the instruction, then one or more entries in the queue is deallocated to allow forward progress of the instruction. This can be achieved by flushing instructions from the pipeline, and therefore, deallocating the queue entries associated with those instructions.

In one example, the instructions that are flushed are those that are younger than the currently executing instruction. This allows the currently executing instruction to allocate the queue entry and execute.

In one implementation of deadlock avoidance, a certain number of queue entries may be kept aside for selected instructions, such as the "older" instructions to ensure that those instructions can execute and complete.

Figure 1A:
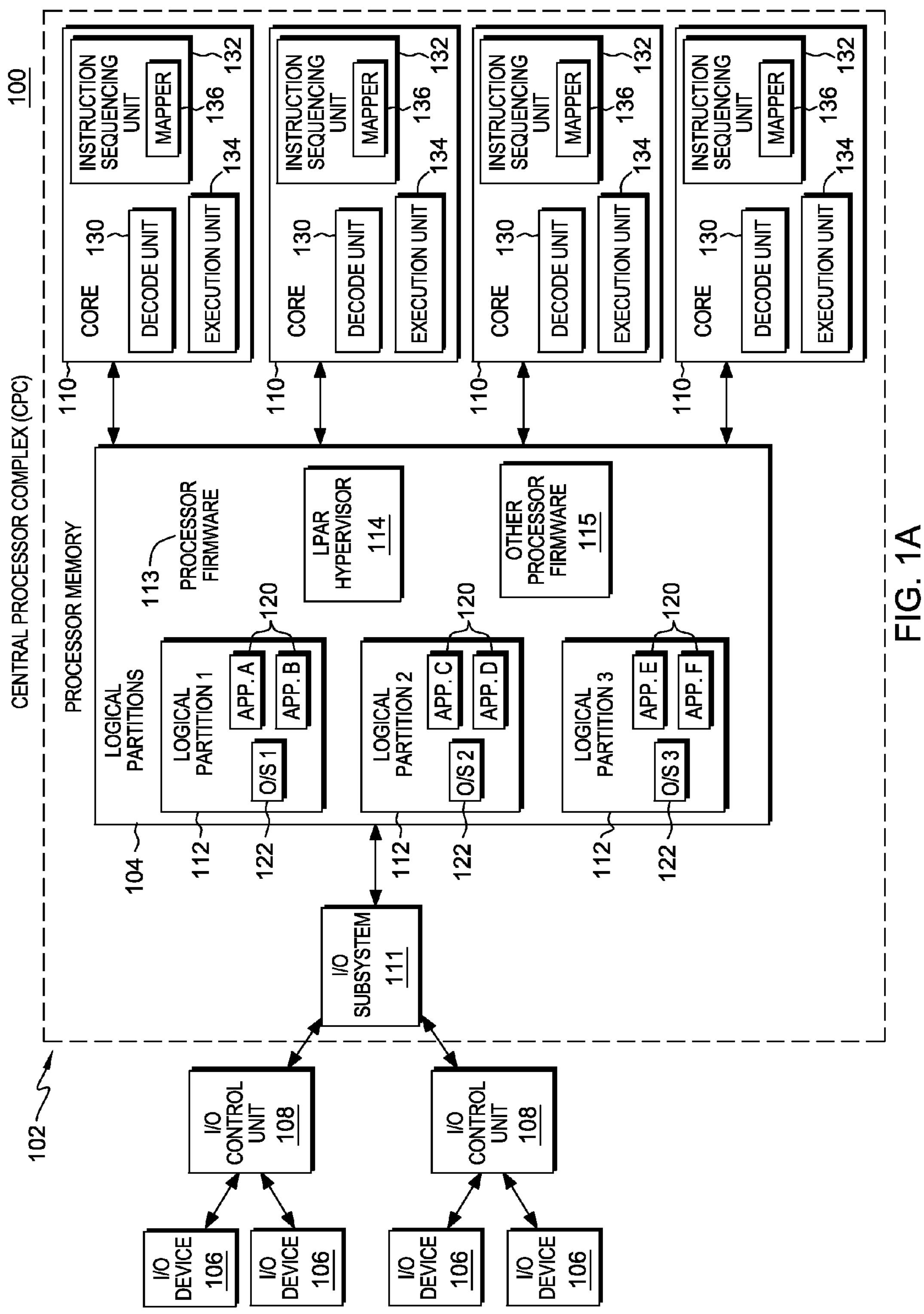
FIG. 1A depicts one example of a computing environment to incorporate and use one or more aspects of a queue management facility.

One example of a computing environment to incorporate and use one or more aspects of a queue management capability is described with reference to FIG. 1A. Referring to FIG. 1A, in one example, a computing environment 100 is based on the z/Architecture, offered by International Business Machines (IBM®) Corporation, Armonk, N.Y. The z/Architecture is described in an IBM® Publication entitled "z/Architecture—Principles of Operation," Publication No. SA22-7832-09, 10$^{th}$ Edition, September 2012, which is hereby incorporated by reference herein in its entirety.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110, and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

Figure 1B:
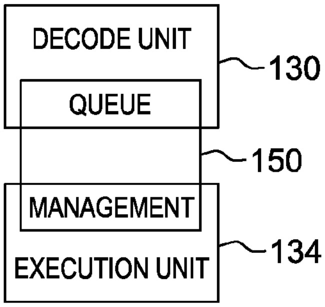
FIG. 1B depicts further details of a decode unit and an execution unit of FIG. 1A, in which each unit includes aspects of a queue management facility.

In one example, each core 110 includes a plurality of processing units, such as a decode unit 130 used to decode instructions received on an instruction pipeline and, in one embodiment, group those instructions; an instruction sequencing unit 132 to dispatch and issue the instructions; and an execution unit 134 to execute the instructions. In one embodiment, instruction sequencing unit 132 includes a mapper 136 used to allocate physical registers to architected registers to be used by the instructions. Further, as shown in FIG. 1B, in accordance with one or more aspects, decode unit 130 and/or execution unit 134 include aspects of a queue management component 150. Queue management component 150 includes, for instance, logic (e.g., hardware and/or software) used to manage tracking queues, such as load and/or store queues, used by the instructions in execution.

Returning to FIG. 1A, input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
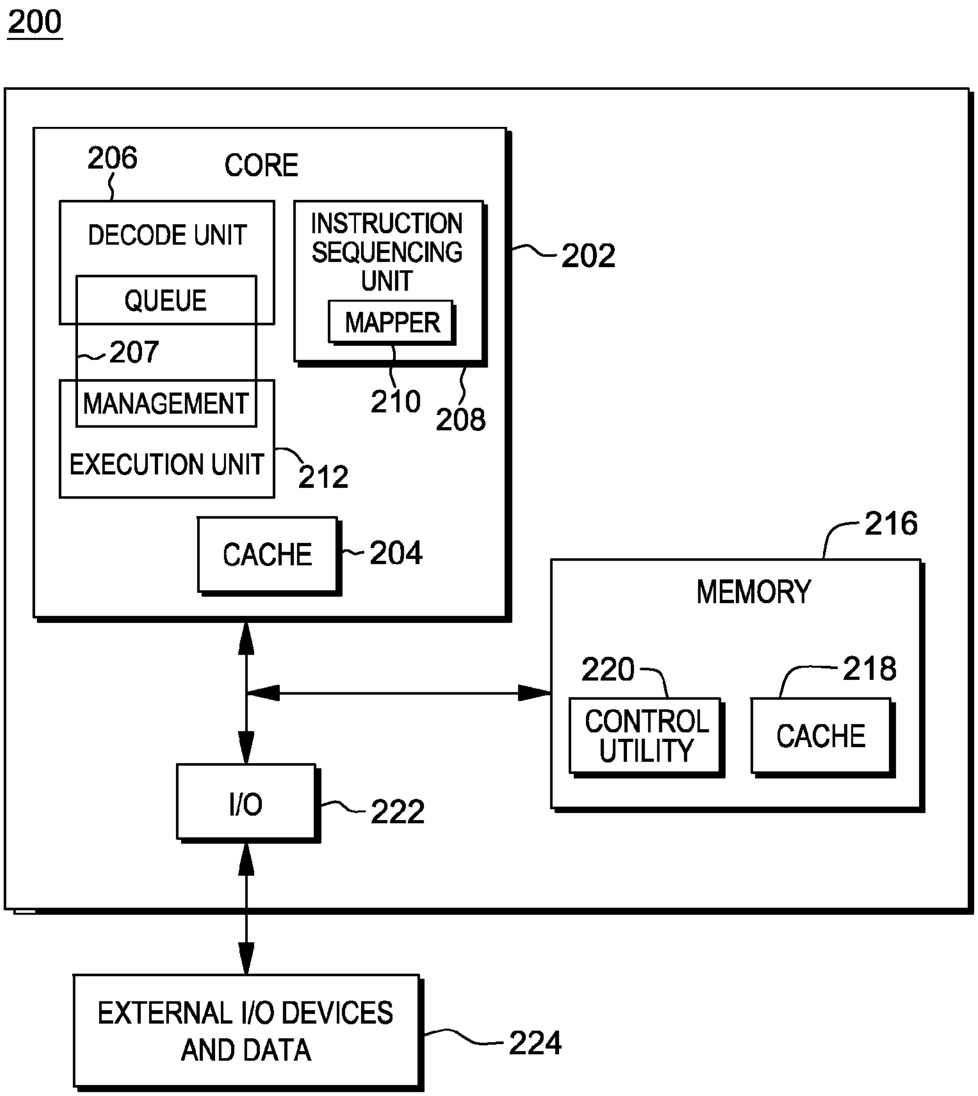
FIG. 2 depicts another example of a computing environment to incorporate and use one or more aspects of a queue management facility.

Another example of a computing environment to incorporate and use one or more aspects of a queue management capability is described with reference to FIG. 2. In this example, a computing environment 200 includes a non-partitioned environment implemented based on the z/Architecture (or another architecture in another embodiment). It includes a core 202 that includes, for instance, one or more caches 204; a decode unit 206; an instruction sequencing unit 208, including a mapper 210; and an execution unit 212. In one implementation, decode unit 206 and/or execution unit 212 include aspects of a queue management component 207 to manage tracking queues.

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
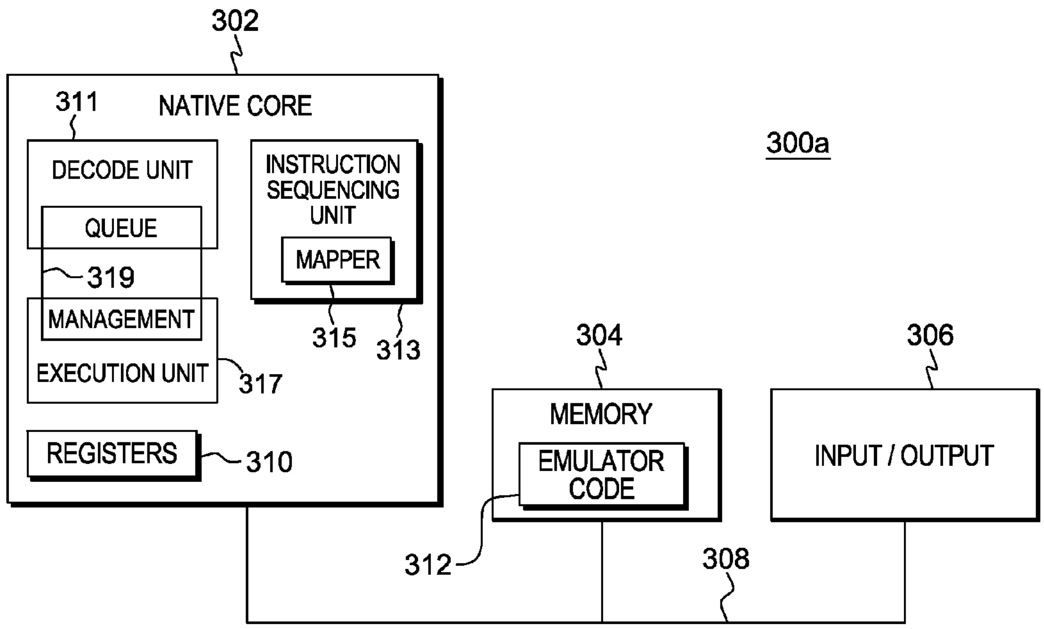
FIG. 3A depicts yet another example of a computing environment to incorporate and use one or more aspects of a queue management facility.

Another embodiment of a computing environment to incorporate and use one or more aspects of a queue management capability is described with reference to FIG. 3A. In this example, a computing environment 300*a* includes, for instance, at least one native core 302, a memory 304, and one or more input/output devices and/or interfaces 306 coupled to one another via, for example, one or more buses 308 and/or other connections. As examples, computing environment 300*a* may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Each native core 302 of the at least one native core includes one or more native registers 310, such as one or more general purpose registers and/or one or more special purpose registers used during processing within the environment that include information that represents the state of the environment at any particular point in time. Further, native core 302 may include, a decode unit 311, an instruction sequencing unit 313 having a mapper 315; and an execution unit 317. Decode unit 311 and/or execution unit 317 may include aspects of a queue management component 319 to manage tracking queues.

Moreover, each native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
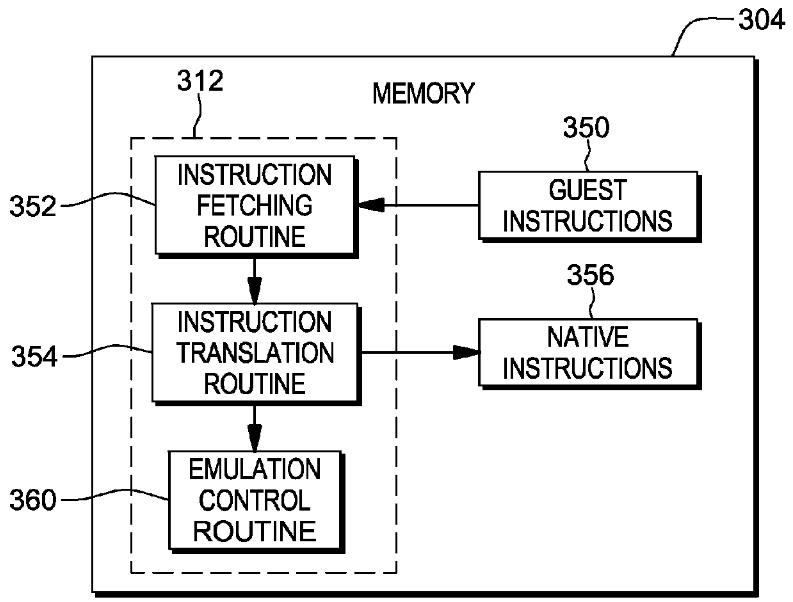
FIG. 3B depicts further details of a memory of the computing environment of FIG. 3A.
Figure 3C:
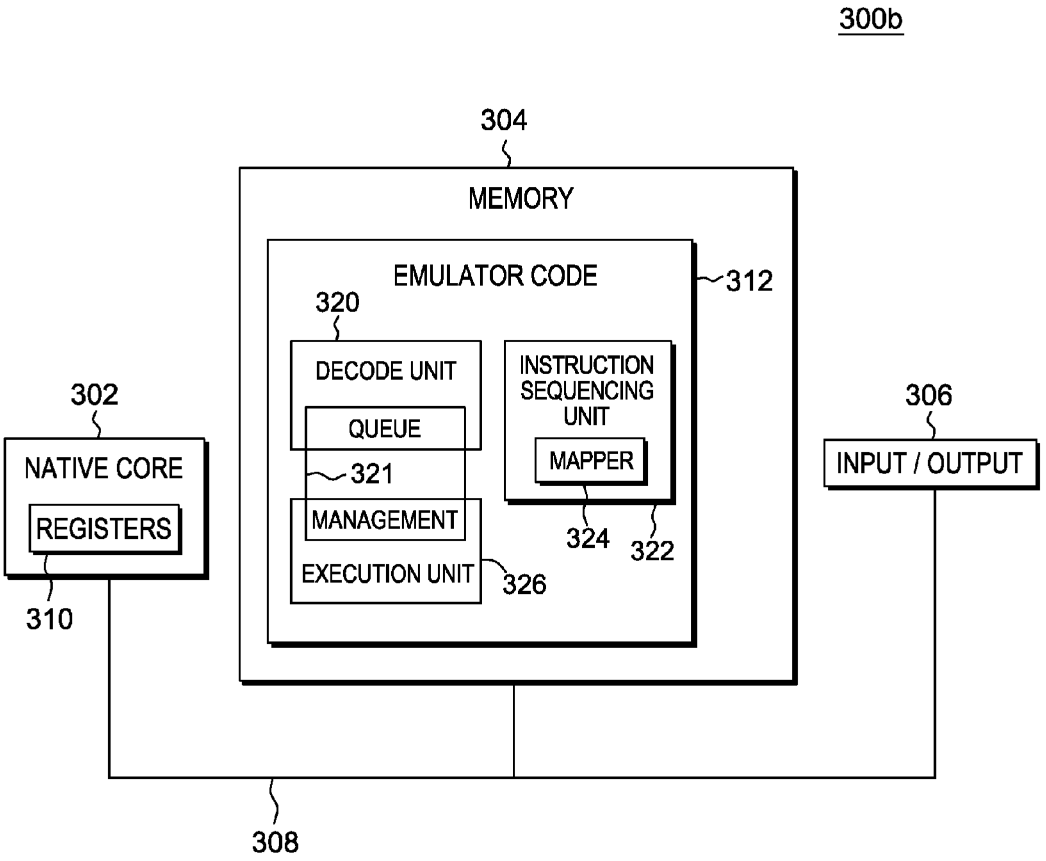
FIG. 3C depicts a further example of a computing environment to incorporate and use one or more aspects of a queue management facility.

In a further embodiment, as shown in FIG. 3C, the decode unit, the instruction sequencing unit and/or the execution unit are being emulated, and therefore, emulator code 312 includes a decode unit 320, an instruction sequencing unit 322 having a mapper 324, and an execution unit 326, each of which is based on an architecture different from the architecture of native core 302, such as the z/Architecture. Once again, decode unit 320 and/or execution unit 326 may include aspects of a queue management component 321 to manage tracking queues.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native core 302 to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the queue management facility described herein. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native core 302. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment. For instance, one or more of the computing environments may have cores that support multithreading, such as simultaneous multithreading (SMT). In such environments, a core may include multiple threads (i.e., multiple logical CPUs operating simultaneously). As examples, in an SMT-2 core, the core may include up to two threads, and in an SMT-4 core, the core may include up to four threads. In support of simultaneous multithreading, the processor core hardware contains the full architected state (e.g., z/Architecture and micro-architected state) for each thread.

In a multi-threaded core, the threads of the core allocate entries from the same load/store queues. Typically, a queue is segregated, such that one thread has access to the first x entries of the queue, and another thread has access to the next x entries, and so forth.

Figure 4:
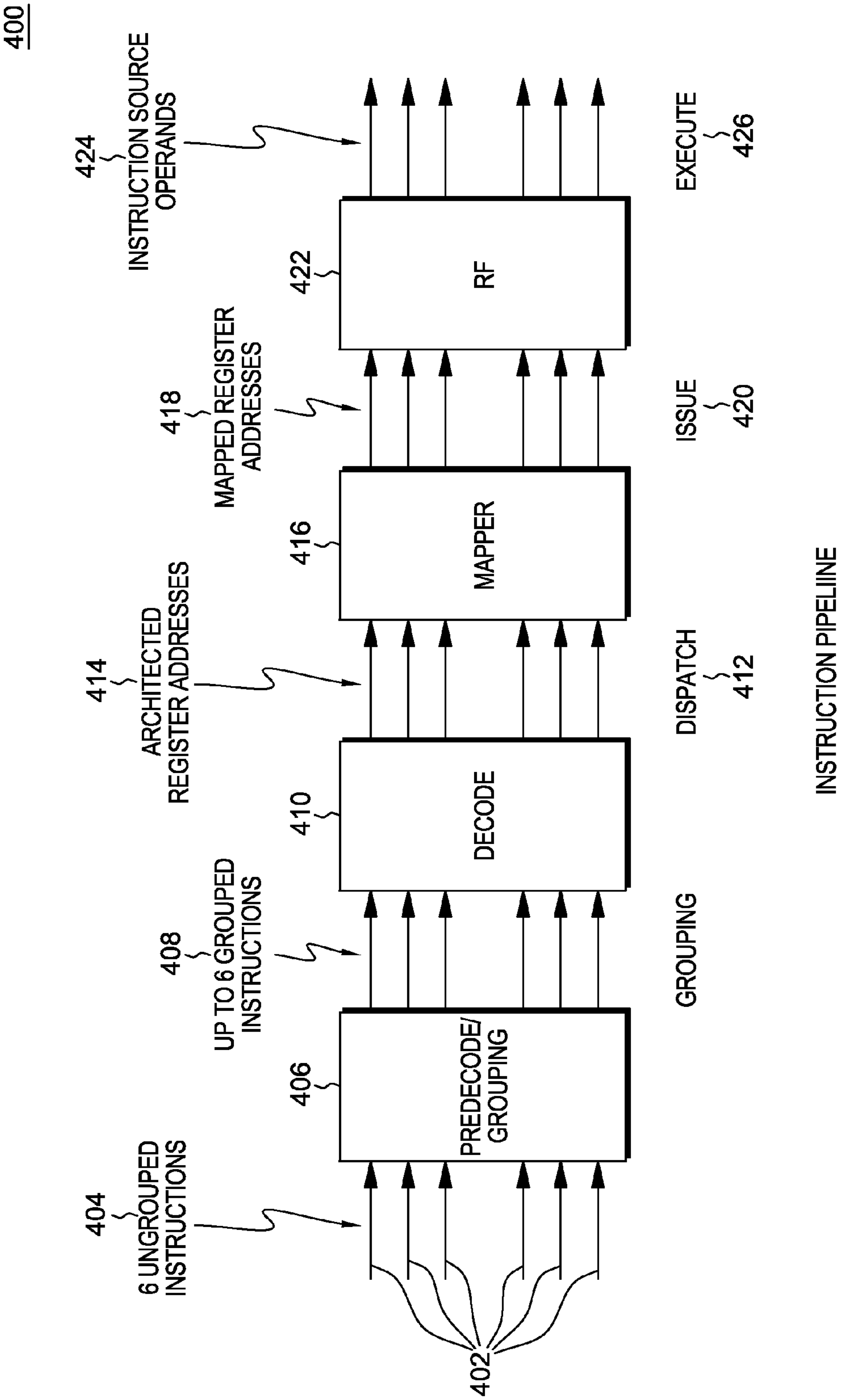
FIG. 4 depicts one example of an instruction pipeline.

In one or more of the computing environments described herein, instructions are executed via an instruction pipeline, an example which is described with reference to FIG. 4. In this particular example, an instruction pipeline 400 is a six-wide instruction pipeline having six pipes 402 that accommodate up to two groups of 1-3 instructions. Initially, six ungrouped instructions 404 are traveling through the pipeline, and are input to predecode/grouping logic 406. This logic determines which instructions can be dispatched together in a group. The output of predecode/grouping logic 406 is up to 6 grouped instructions 408 (e.g., two groups of three instructions). The groups are passed to decode logic 410, which calculates information used by the mapper or execution units. In one example, predecode/grouping logic 406 and decode logic 410 are in the decode unit of the core. However, in other examples, they may be in separate or different units.

The decoded instructions are dispatched 412 to the instruction sequencing unit, and in particular, to a mapper 416 of the instruction sequencing unit. Mapper 416 assigns physical register addresses to architected registers used by the instructions. The instructions with the physical register addresses are then broadcast in an issue stage 420 to execution units 426. During execution, register file 422 is accessed to obtain instruction operands 424 using the physical addresses from the mapper.

In execution of certain instructions, such as load and store instructions, in environments such as those that support out-of-order execution, tracking queues (e.g., load and store queues, respectively) are used to enforce proper ordering of the instructions. In accordance with one aspect, entries of the load and store queues are allocated to load and store instructions at execution stage 426 rather than dispatch stage 412, as in previous implementations. This reduces the overall time an entry remains allocated to a specific instruction. However, as a consequence of this scheme, all of the queue entries may be allocated to younger instructions which are ready to execute before older instructions, preventing the older instructions from executing. This may result in a deadlock condition if, for instance, a younger instruction is dependent on results produced from the older instruction, and thus, cannot complete execution either.

Figure 5A:
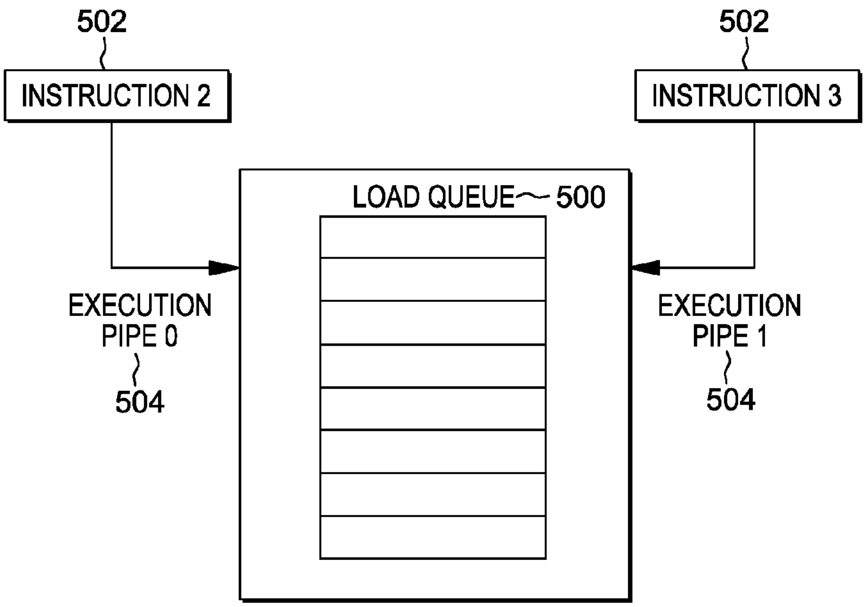
FIGS. 5A-5D are used to illustrate one example of a deadlock condition.
Figure 5B:
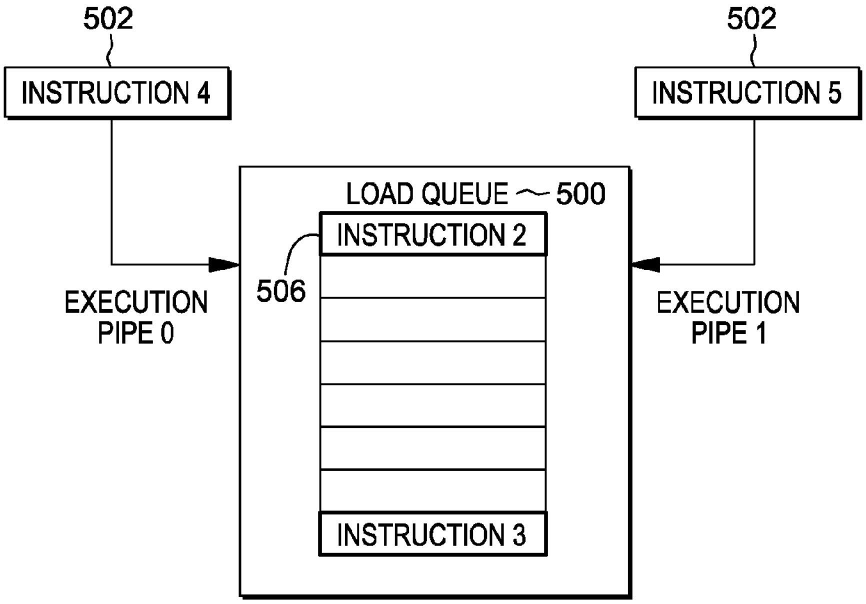
Figure 5C:
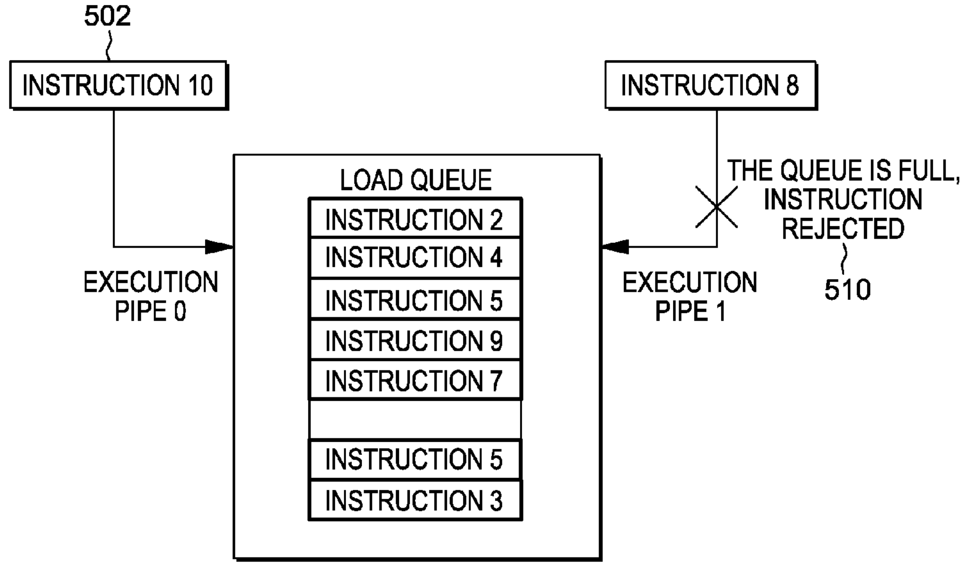
Figure 5D:
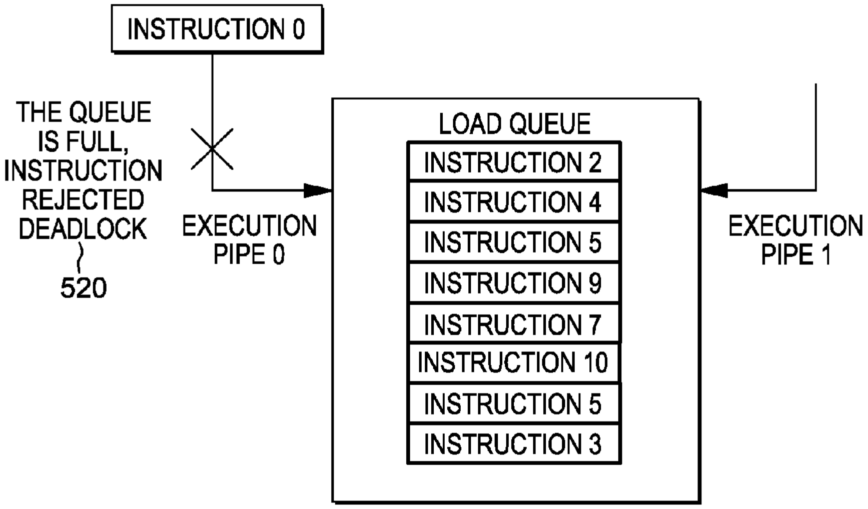

One example of a deadlock condition for a load queue is described with reference to FIGS. 5A-5D. A similar situation may be applicable to a store queue. As shown in FIG. 5A, a load queue 500 is initially empty, but multiple instructions 502 executing on multiple pipes 504 of an instruction pipeline are to be allocated entries 506, as further shown in FIG. 5B. Additionally, as depicted in FIGS. 5B-5C, additional instructions 502 are allocated queue entries, filling up the queue. Thus, in this particular example, Instruction 8 of FIG. 5C is rejected (510), since the queue is full (see FIG. 5D), and therefore, the instruction cannot be executed. Additionally, as shown in FIG. 5D, an older instruction, Instruction 0, is issued, but it cannot allocate a queue entry because the queue is full. Thus, Instruction 0 cannot execute and instructions dependent on results produced by Instruction 0 also cannot execute, resulting in a deadlock 520.

One embodiment of logic associated with managing load and/or store queues, including handling deadlock conditions, in accordance with one or more aspects, is described with reference to FIGS. 6A-6B. The logic of FIGS. 6A-6B is performed by a processor during, for instance, the decode/execute stages of the pipeline.

Figure 6A:
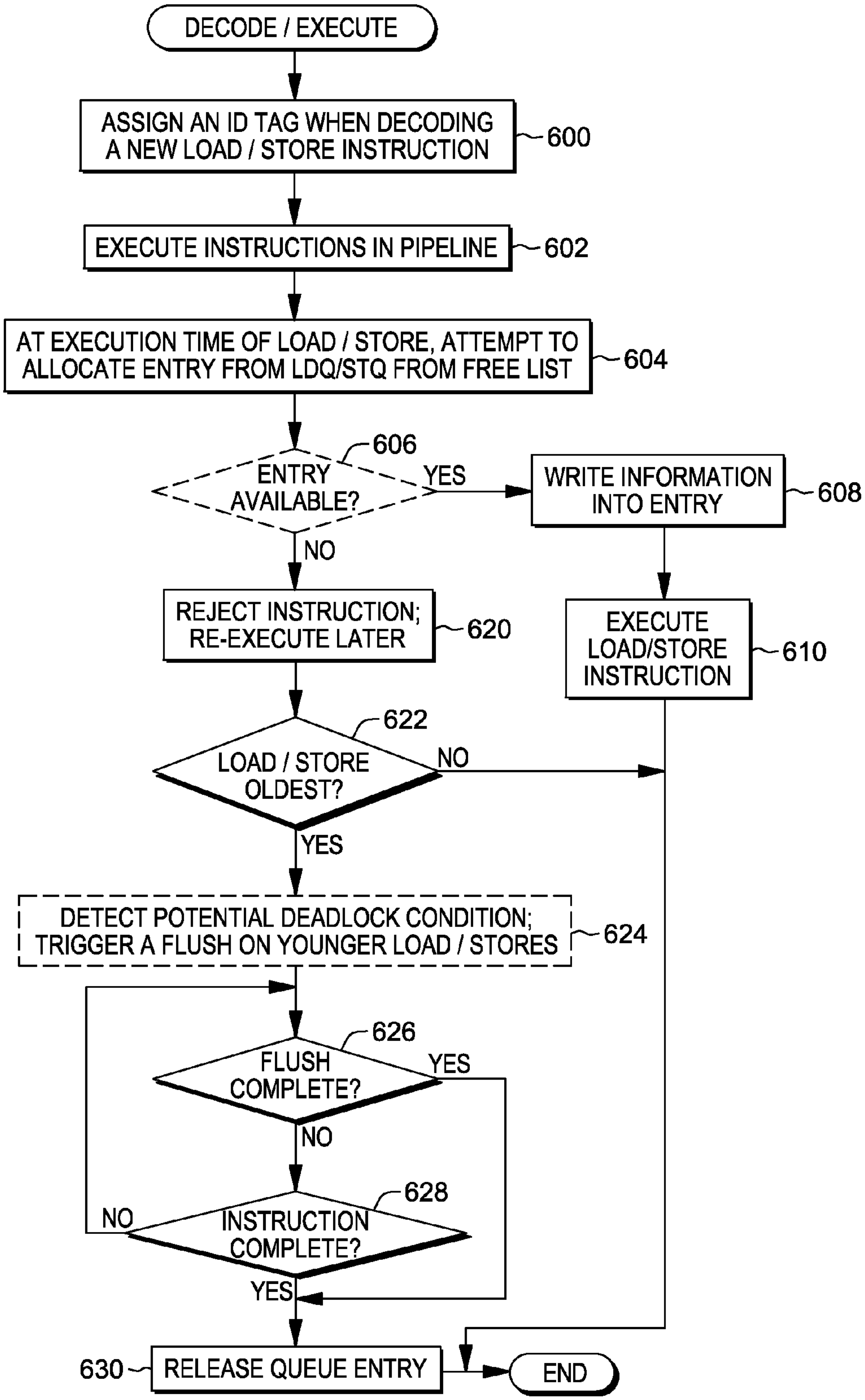
FIG. 6A depicts one embodiment of logic to manage load and store queues during decode and execute stages of a pipeline.
Figure 6B:
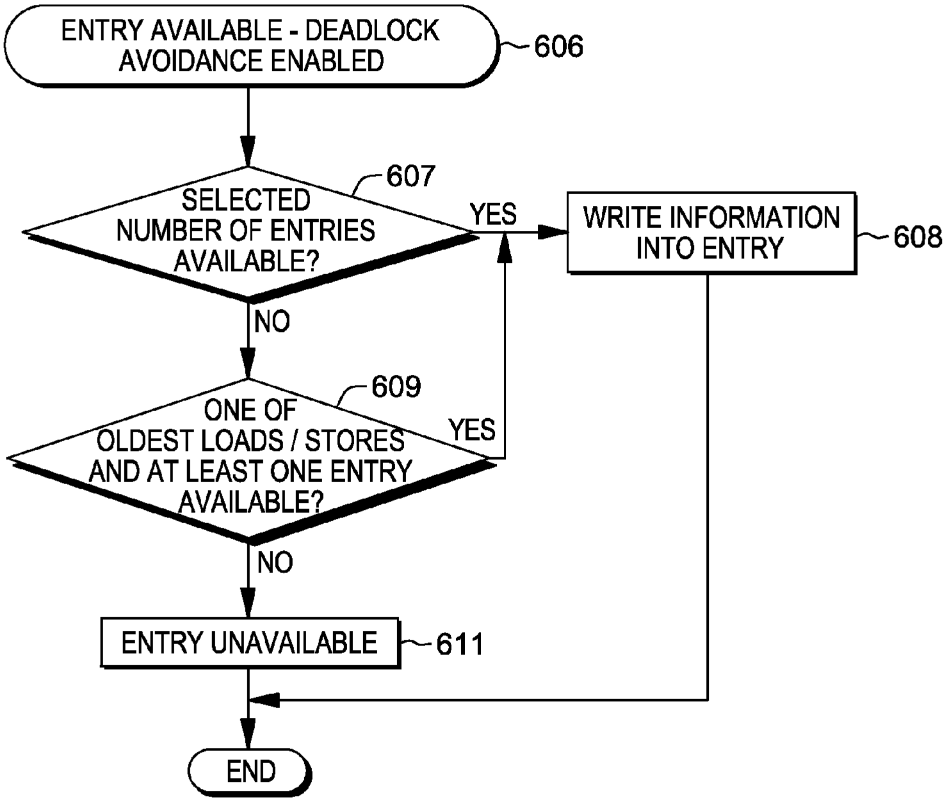
FIG. 6B depicts one embodiment of further details associated with determining when a queue entry is available to be allocated.

Referring initially to FIG. 6A, based on a new load or store instruction being decoded, the processor (e.g., the decode unit) assigns an identification tag to the instruction, STEP 600. This identification tag may be used to compare age of this instruction to instructions decoded before and after this instruction. For instance, the identification tag includes a time stamp or some other indicator used to indicate relative age.

Additionally, the processor executes instructions within the pipeline, STEP 602. The instructions are executed out-of-order where dependencies allow for out-of-order execution. At execution time of a load or store instruction, in accordance with one or more aspects, the execution unit, as an example, attempts to allocate an entry from a load queue (LDQ) or a store queue (STQ) free list, depending on whether the instruction is a load instruction or a store instruction, STEP 604. In one example, the free list is a bit mask of free entries. If an entry is available, INQUIRY 606, then information about the load or store instruction is written into the load queue entry or the store queue entry, respectively, including the identification tag, STEP 608. The load or store instruction executes, STEP 610.

Returning to INQUIRY 606, if an entry is not available, then the instruction is rejected and may be re-executed later, STEP 620. Additionally, in one embodiment, a determination is made as to whether this load or store instruction was the oldest load or store instruction in the pipeline, STEP 622. If not, then processing ends. However, if the instruction is the oldest, then a potential deadlock is detected. The processor may be triggered to perform a flush of younger load or store instructions in the pipeline to clear out entries from the load queue or store queue enabling the oldest load or store instruction to re-execute later, STEP 624. In one example, the identification tags in the instructions are used to determine relative age of the instructions.

In one embodiment, a flush is performed after multiple attempted re-executions and a consistently full queue. In a further embodiment, a flush is performed after one rejection.

A determination is made as to whether a flush of an instruction is complete, INQUIRY 626. If the flush is not complete, then processing continues to INQUIRY 628 to determine whether an instruction has completed execution. If an instruction has completed execution, INQUIRY 628, or if a flush has completed, INQUIRY 626, then a queue entry corresponding to that instruction is released, STEP 630. For instance, in one example, the corresponding bit in the free list is set to one. The rejected instruction may then be re-executed. However, if a flush nor an instruction is complete, then processing continues to INQUIRY 626.

In a further embodiment, deadlock avoidance may be enabled. If such a technique is enabled, then the determination as to whether an entry is available, INQUIRY 606, has further considerations. For instance, referring to FIG. 6B, to determine if an entry is available, a determination is made as to whether a selected number of entries are available (e.g., more than three), INQUIRY 607. If at least the selected number of entries is available, then an entry is considered available. Thus, one of the entries is selected and information for the instruction is written into the entry, STEP 608, as described above. However, if the selected number of entries is not available, then a determination is made as to whether this instruction is one of the oldest load or store instructions in the pipeline and at least one entry is available, INQUIRY 609. If so, then an entry is considered available; and thus, an entry is selected and information is written into the entry, STEP 608. However, if this is not one of the oldest load or store instructions or if at least one entry is not available, then the entry is unavailable, STEP 611.

In one embodiment, deadlock avoidance is enabled after a deadlock condition is encountered. It is enabled for a predetermined amount of time, and then disabled. In yet a further embodiment, it is enabled regardless of whether a deadlock condition has been encountered.

Figure 7:
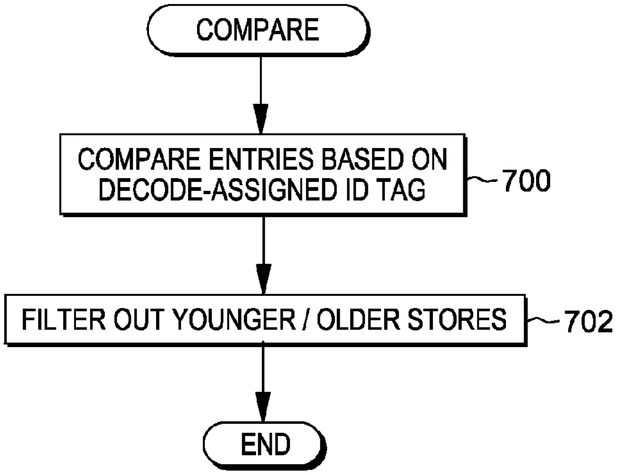
FIG. 7 depicts one embodiment of logic to compare actual results produced from executing an instruction to predicted results for that instruction.

Referring to FIG. 7, one embodiment of logic associated with a compare operation in which a store instruction is searching the load queue for younger loads on the same address is described. Referring to FIG. 7, in one embodiment, entries of the load queue are compared based on the identification tags assigned to the instructions at decode, STEP 700. In one example, all of the entries of the queue are searched since queue entries are not allocated in order, and thus, location in the queue is no longer an indication of relative age of the instruction. An instruction may be allocated any entry within the queue. Based on the search, those instructions that are younger or older than the store instruction, based on what is the basis for the search, are filtered out, STEP 702.

Described herein is a queue management capability that manages queue entries allocated at execution time, rather than decode time. The queue management capability may also include deadlock resolution and/or deadlock avoidance. It may be used in processors that do not include multithreading, as well as processors that do include multithreading.

Figure 8:
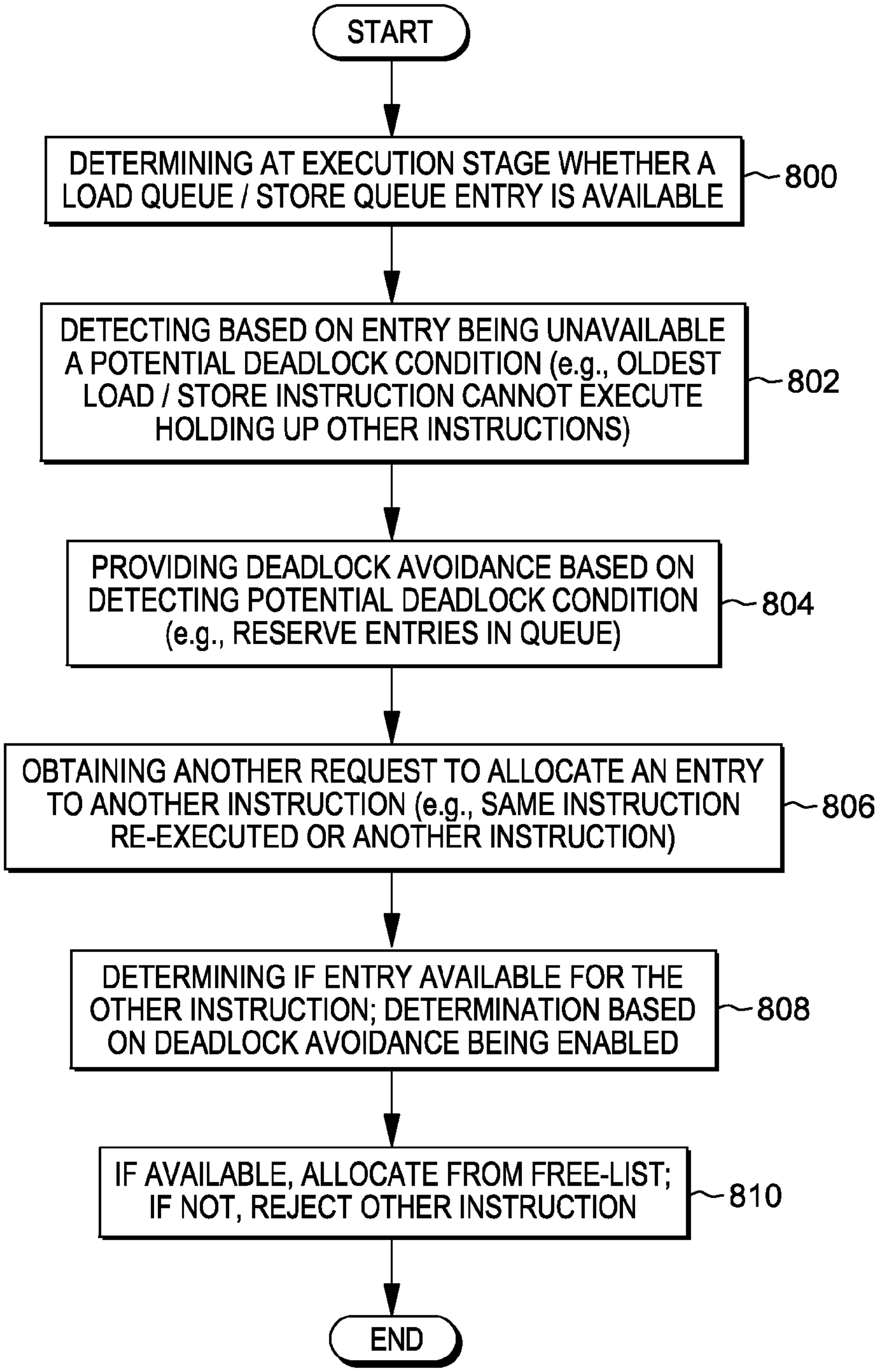
FIG. 8 depicts one particular embodiment of logic associated with queue management.

In one particular embodiment, referring to FIG. 8, a determination is made, at execution stage, as to whether a load queue or store queue entry (depending on whether the instruction to be executed is a load instruction or a store instruction) is available, STEP 800. If the entry is unavailable, then a potential deadlock condition is detected (e.g., the oldest load/store instruction cannot execute since it cannot have an entry allocated for it, thus, possibly preventing instructions dependent on it from executing), STEP 802.

Based on detecting the potential deadlock condition, deadlock avoidance is provided to avoid a further potential deadlock condition, STEP 804. This includes, for instance, reserving one or more entries in the queue for allocation to one or more selected instructions, such as the oldest load or store instructions in the pipeline.

Thereafter, subsequent to enabling deadlock avoidance, another request is obtained to allocate an entry to another instruction (either the same instruction that was rejected and now re-executed or another instruction), STEP 806. A determination is made as to whether the entry is available for allocation to the other instruction, STEP 808. In one example, this determination is based on deadlock avoidance being enabled, and thus, the steps in, for instance, FIG. 6B are performed. Referring once again to FIG. 8, if the queue entry is available, then it is allocated from the free-list; otherwise, the other instruction is rejected, STEP 810.

In one or more aspects, tracking resources, such as load and/or store queue entries, are allocated at execution-time to instructions executed out-of-order. An instruction is allocated a load queue entry or a store queue entry at execution time, and then, the queue entry is released upon instruction completion and checkpointing. If no queue entry is available at execution time, the instruction is rejected and may be re-executed.

Available queue entries are maintained, for instance, in a free list in order to be able to allocate them when instructions are issued for execution on parallel execution pipelines.

Deadlock resolution may also be provided, in one or more aspects, in which at least a part of the queue is deallocated to allow execution of the oldest instructions. Instructions whose queue entries have been deallocated may be re-executed.

Deadlock avoidance may also be provided, in one or more aspects, in which when the queues become nearly full, the last available entries are preserved and allocated to selected instructions, such as the oldest instructions that are first in line for completion.

In one aspect, deadlock avoidance is selectively applied under specific conditions. Reservation of queue entries may reduce effective queue sizes and therefore, have a negative impact on overall out-of-order execution performance. Thus, in one implementation, entry reservation is applied after encountering execution penalties of queue deallocation for deadlock resolution. Then, this mode is maintained for a certain period of time, after which it is disabled.

As used herein, storage, central storage, main storage, memory and main memory are used interchangeably, unless otherwise noted, implicitly by usage or explicitly.

Figure 9:
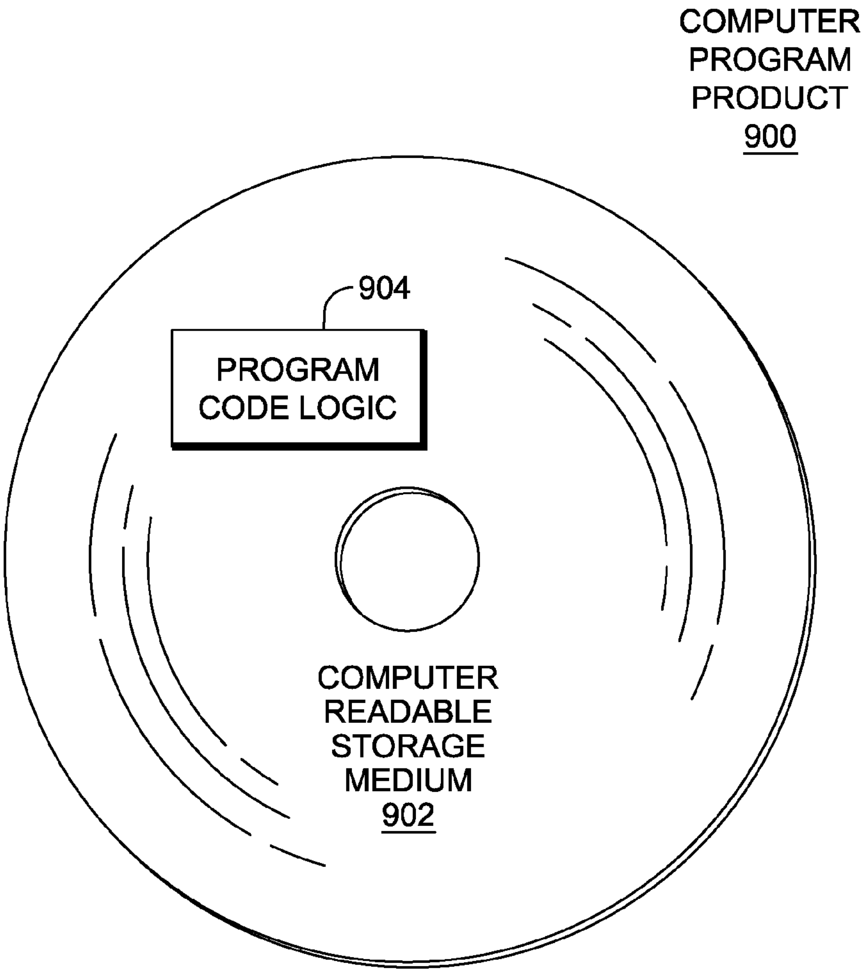
FIG. 9 depicts one embodiment of a computer program product incorporating one or more aspects.

Referring to FIG. 9, in one example, a computer program product 900 includes, for instance, one or more non-transitory computer readable storage media 902 to store computer readable program code means, logic and/or instructions 904 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different stages of an instruction pipeline, different grouping of instructions, including the number of groups and/or the number of instructions in groups etc. may be accommodated. Further, other types of resources may be managed in one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for managing allocation of resources in a computing environment, said computer system comprising:

a memory; and a processor in communication with the memory, wherein the computer system is configured to perform a method, said method comprising:

determining, by a processor at execution stage rather than at dispatch stage of an instruction pipeline of an out-of-order execution computing environment, whether an entry of a queue is available to be allocated to an instruction at the execution stage of the instruction pipeline, wherein the queue is a load queue based on the instruction being a load instruction or a store queue based on the instruction being a store instruction, and wherein the determining whether an entry is available depends on whether deadlock avoidance used to avoid a potential deadlock condition is enabled, wherein based on deadlock avoidance being enabled, the determining whether an entry is available is based on at least a determination of availability of a selected number of entries greater than one being available, and wherein based on deadlock avoidance not being enabled, the determining whether an entry is available is based on whether a free entry exists;

detecting, based on determining that the entry is unavailable, a potential deadlock condition in which the instruction is not executed;

enabling, based on the detecting the potential deadlock condition, deadlock avoidance to avoid a further potential deadlock condition, wherein the enabling deadlock avoidance comprises reserving one or more entries of the queue for allocation to one or more selected instructions, and wherein deadlock avoidance is not enabled based on the potential deadlock condition not being detected; and disabling deadlock avoidance, based on enabling deadlock avoidance, after a predetermined amount of time to improve out-of-order execution performance, wherein based on disabling deadlock avoidance, the determining whether an entry is available is based on whether one free entry exists rather than the selected number of entries greater than one and the reserving of one or more entries of the queue is not performed.

2. The computer system of claim 1, wherein the one or more selected instructions comprises one or more oldest load instructions or one or more oldest store instructions in the instruction pipeline, depending on whether the instruction is a load instruction or a store instruction.

3. The computer system of claim 1, wherein the method further comprises:

obtaining another request to allocate another entry of the queue for another instruction, subsequent to providing deadlock avoidance; and determining whether the another entry of the queue is available to be allocated to the other instruction, wherein the determining whether the another entry of the queue is available to be allocated to the other instruction comprises checking whether one or more entries in addition to the one or more reserved entries are available, wherein based on the one or more entries in addition to the one or more reserved entries being available, the another entry is available for allocation to the other instruction.

4. The computer system of claim 3, wherein the determining whether the another entry of the queue is available to be allocated to the other instruction further comprises determining, based on the checking indicating that the one or more entries in addition to the one or more reserved entries are not available, whether one entry in the queue is available for allocation and whether the other instruction for which the one entry is to be allocated is an oldest instruction of its type in the instruction pipeline, wherein based on the one entry being available and the instruction being the oldest, the another entry is available for allocation to the other instruction.

5. The computer system of claim 4, wherein the other instruction is one of: the instruction re-executed or a different instruction.

6. The computer system of claim 4, wherein the determining whether the other instruction is the oldest instruction of its type in the instruction pipeline comprises checking an identification tag assigned to the other instruction.

7. The computer system of claim 1, wherein the method further comprises allocating the entry to the instruction, based on determining the entry is available, wherein the allocating comprises allocating the entry from a free list of entries of the queue.

8. A computer program product for managing allocation of resources in a computing environment, said computer program product comprising:

a computer readable storage medium readable by a processing circuit and storing instructions for execution by the processing circuit for performing a method comprising:

determining, by a processor at execution stage rather than at dispatch stage of an instruction pipeline of an out-of-order execution computing environment, whether an entry of a queue is available to be allocated to an instruction at the execution stage of the instruction pipeline, wherein the queue is a load queue based on the instruction being a load instruction or a store queue based on the instruction being a store instruction, and wherein the determining whether an entry is available depends on whether deadlock avoidance used to avoid a potential deadlock condition is enabled, wherein based on deadlock avoidance being enabled, the determining whether an entry is available is based on at least a determination of availability of a selected number of entries greater than one being available, and wherein based on deadlock avoidance not being enabled, the determining whether an entry is available is based on whether a free entry exists;

detecting, based on determining that the entry is unavailable, a potential deadlock condition in which the instruction is not executed;

enabling, based on the detecting the potential deadlock condition, deadlock avoidance to avoid a further potential deadlock condition, wherein the providing deadlock avoidance comprises reserving one or more entries of the queue for allocation to one or more selected instructions, and wherein deadlock avoidance is not enabled based on the potential deadlock condition not being detected; and disabling deadlock avoidance, based on enabling deadlock avoidance, after a predetermined amount of time to improve out-of-order execution performance, wherein based on disabling deadlock avoidance, the determining whether an entry is available is based on whether one free entry exists rather than the selected number of entries greater than one and the reserving of one or more entries of the queue is not performed.

9. The computer program product of claim 8, wherein the one or more selected instructions comprises one or more oldest load instructions or one or more oldest store instructions in the instruction pipeline, depending on whether the instruction is a load instruction or a store instruction.

10. The computer program product of claim 8, wherein the method further comprises:

obtaining another request to allocate another entry of the queue for another instruction, subsequent to providing deadlock avoidance; and determining whether the another entry of the queue is available to be allocated to the other instruction, wherein the determining whether the another entry of the queue is available to be allocated to the other instruction comprises checking whether one or more entries in addition to the one or more reserved entries are available, wherein based on the one or more entries in addition to the one or more reserved entries being available, the another entry is available for allocation to the other instruction.

11. The computer program product of claim 10, wherein the determining whether the another entry of the queue is available to be allocated to the other instruction further comprises determining, based on the checking indicating that the one or more entries in addition to the one or more reserved entries are not available, whether one entry in the queue is available for allocation and whether the other instruction for which the one entry is to be allocated is an oldest instruction of its type in the instruction pipeline, wherein based on the one entry being available and the instruction being the oldest, the another entry is available for allocation to the other instruction.

12. The computer program product of claim 11, wherein the other instruction is one of: the instruction re-executed or a different instruction.

13. The computer program product of claim 11, wherein the determining whether the other instruction is the oldest instruction of its type in the instruction pipeline comprises checking an identification tag assigned to the other instruction.

14. The computer program product of claim 8, wherein the method further comprises allocating the entry to the instruction, based on determining the entry is available, wherein the allocating comprises allocating the entry from a free list of entries of the queue.

15. A method of managing allocation of resources in a computing environment, said method comprising:

determining, by a processor at execution stage rather than at dispatch stage of an instruction pipeline of an out-of-order execution computing environment, whether an entry of a queue is available to be allocated to an instruction at the execution stage of the instruction pipeline, wherein the queue is a load queue based on the instruction being a load instruction or a store queue based on the instruction being a store instruction, and wherein the determining whether an entry is available depends on whether deadlock avoidance used to avoid a potential deadlock condition is enabled, wherein based on deadlock avoidance being enabled, the determining whether an entry is available is based on at least a determination of availability of a selected number of entries greater than one being available, and wherein based on deadlock avoidance not being enabled, the determining whether an entry is available is based on whether a free entry exists;

detecting, based on determining that the entry is unavailable, a potential deadlock condition in which the instruction is not executed; and enabling, based on the detecting the potential deadlock condition, deadlock avoidance to avoid a further potential deadlock condition, wherein the providing deadlock avoidance comprises reserving one or more entries of the queue for allocation to one or more selected instructions, and wherein deadlock avoidance is not enabled based on the potential deadlock condition not being detected; and disabling deadlock avoidance, based on enabling deadlock avoidance, after a predetermined amount of time to improve out-of-order execution performance, wherein based on disabling deadlock avoidance, the determining whether an entry is available is based on whether one free entry exists rather than the selected number of entries greater than one and the reserving of one or more entries of the queue is not performed.

16. The method of claim 15, wherein the one or more selected instructions comprises one or more oldest load instructions or one or more oldest store instructions in the instruction pipeline, depending on whether the instruction is a load instruction or a store instruction.

17. The method of claim 15, further comprising:

obtaining another request to allocate another entry of the queue for another instruction, subsequent to providing deadlock avoidance; and determining whether the another entry of the queue is available to be allocated to the other instruction, wherein the determining whether the another entry of the queue is available to be allocated to the other instruction comprises checking whether one or more entries in addition to the one or more reserved entries are available, wherein based on the one or more entries in addition to the one or more reserved entries being available, the another entry is available for allocation to the other instruction.

18. The method of claim 17, wherein the determining whether the another entry of the queue is available to be allocated to the other instruction further comprises determining, based on the checking indicating that the one or more entries in addition to the one or more reserved entries are not available, whether one entry in the queue is available for allocation and whether the other instruction for which the one entry is to be allocated is an oldest instruction of its type in the instruction pipeline, wherein based on the one entry being available and the instruction being the oldest, the another entry is available for allocation to the other instruction.

19. The method of claim 18, wherein the determining whether the other instruction is the oldest instruction of its type in the instruction pipeline comprises checking an identification tag assigned to the other instruction.

20. The computer system of claim 1, wherein based on the selected number of entries being available, an entry is available, and based on the selected number of entries being unavailable, the method further comprises determining whether the instruction is an oldest instruction of its type in the instruction pipeline and whether at least one entry in the queue is available, and based on the instruction being the oldest instruction of its type and at least one entry being available, an entry is available, and based on the instruction not being the oldest instruction of its type in the instruction pipeline or based on at least one entry not being available, an entry is unavailable.

* * * * *